(12) United States Patent
Gandhi et al.

(10) Patent No.: US 11,158,349 B2
(45) Date of Patent: Oct. 26, 2021

(54) METHODS AND SYSTEMS OF AUTOMATICALLY GENERATING VIDEO CONTENT FROM SCRIPTS/TEXT

(71) Applicants: Vineet Gandhi, Hyderabad (IN); Srinivasa Raghavan Rajendran, chennai (IN)

(72) Inventors: Vineet Gandhi, Hyderabad (IN); Srinivasa Raghavan Rajendran, chennai (IN)

( * ) Notice: Subject to any disclaimer, the term of this patent is extended or adjusted under 35 U.S.C. 154(b) by 0 days.

(21) Appl. No.: 16/397,240

(22) Filed: Apr. 29, 2019

(65) Prior Publication Data

US 2020/0342909 A1    Oct. 29, 2020

(51) Int. Cl.
| | |
|---|---|
| *G11B 27/036* | (2006.01) |
| *G06N 20/00* | (2019.01) |
| *G06F 40/134* | (2020.01) |
| *G06F 40/205* | (2020.01) |
| *G06F 40/289* | (2020.01) |
| *G06N 7/00* | (2006.01) |

(52) U.S. Cl.
CPC .......... *G11B 27/036* (2013.01); *G06F 40/134* (2020.01); *G06F 40/205* (2020.01); *G06F 40/289* (2020.01); *G06N 7/005* (2013.01); *G06N 20/00* (2019.01)

(58) Field of Classification Search
CPC ..................................................... G11B 27/036
USPC ........................................................... 386/278
See application file for complete search history.

(56) References Cited

U.S. PATENT DOCUMENTS

| | | | | |
|---|---|---|---|---|
| 2010/0217671 A1* | 8/2010 | Lee | ...... | H04N 21/812 705/14.53 |
| 2011/0320429 A1* | 12/2011 | Doig | ...... | G06F 16/972 707/711 |
| 2019/0304157 A1* | 10/2019 | Amer | ...... | G06N 3/0445 |

\* cited by examiner

*Primary Examiner* — Daniel T Tekle (57) ABSTRACT

In one aspect, a computerized method for automatically generating digital video content from scripts includes a media engine. The media engine receives a script and a plurality of flags; sending the script to a natural language processing (NLP) engine. The NLP engine parses the script. The script is broken into a set of keywords and phrases in a JSON format. The NLP engine, based on the keywords and phrases and the plurality of flags, obtains a relevant background scene for the video and a relevant set of assets for the video, and a set of associated attributes of each of the set of assets. In an asset is a character or object for the video. The NLP engine provides the parsed script in the JSON format and the relevant background scene of the video and the relevant set of assets of the video, and the set of associated attributes of each of the set of assets to a layout engine. The layout engine, based on the parsed script in the JSON format, automatically constructs the video with the relevant background scene of the video and the relevant set of assets of the video, and the set of associated attributes of each of the set of assets.

16 Claims, 13 Drawing Sheets

METHODS AND SYSTEMS OF AUTOMATICALLY GENERATING VIDEO CONTENT FROM SCRIPTS/TEXT

BACKGROUND

Field of the Invention

The invention is in the field of computer animation and more specifically to a method, system and apparatus for automatically generating video content from scripts/text.

Description of the Related Art

Computer animation can enable the creation of digital videos. These videos can be engaging and entertaining. Therefore, the ability to generate and include specific computer animations would greatly enhance a presentation.

However, at the same time, computer animation can be an arduous manual process. It can require sophisticated training to create as well. Current computer animation applications often lack flexibility and require arduous preparation for each specific character. Accordingly, there is a need to improve the automation of the computer animation creation in an automatic process.

BRIEF SUMMARY OF THE INVENTION

In one aspect, a computerized method for automatically generating digital video content from scripts includes a media engine. The media engine receives a script and a plurality of flags; sending the script to a natural language processing (NLP) engine. The NLP engine parses the script. The script is broken into a set of keywords and phrases in a JSON format. The NLP engine, based on the keywords and phrases and the plurality of flags, obtains a relevant background scene for the video and a relevant set of assets for the video, and a set of associated attributes of each of the set of assets. In an asset is a character or object for the video. The NLP engine provides the parsed script in the JSON format and the relevant background scene of the video and the relevant set of assets of the video, and the set of associated attributes of each of the set of assets to a layout engine. The layout engine, based on the parsed script in the JSON format, automatically constructs the video with the relevant background scene of the video and the relevant set of assets of the video, and the set of associated attributes of each of the set of assets.

BRIEF DESCRIPTION OF THE DRAWINGS

The Figures described above are a representative set and are not an exhaustive with respect to embodying the invention.

DESCRIPTION

Disclosed are a system, method, and article of manufacture for automatically generating video content from scripts/text. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Amazon S3® bucket is a public cloud storage resource available in Amazon® Web Services (AWS) Simple Storage Service (S3) as an object storage offering.

Contextual search is a form of optimizing web-based search results based on context provided by the user and the computer being used to enter the query. Contextual search services differ from current search engines based on traditional information retrieval that return lists of documents based on their relevance to the query. Contextual search can increase the precision of results based on how valuable they are to individual users.

Cosine similarity is a measure of similarity between two non-zero vectors of an inner product space that measures the cosine of the angle between them.

Extensible Markup Language (XML) is a markup language that defines a set of rules for encoding documents in a format that is both human-readable and machine-readable.

Heat map is a graphical representation of data where the individual values contained in a matrix are represented as colors.

JavaScript Object Notation (JSON) is an open-standard file format that uses human-readable text to transmit data objects consisting of attribute—value pairs and array data types (or any other serializable value).

k-means clustering is a method of vector quantization used for cluster analysis. k-means clustering can be used to partition n observations into k clusters in which each observation belongs to the cluster with the nearest mean, serving as a prototype of the cluster.

Natural language processing (NLP) comprises the interactions between computers and human (natural) languages, and how to program computers to process and analyze large amounts of natural language data.

Saliency can be a pixel's unique quality. Saliency can be used to simplify and/or change the representation of an image into something that is more meaningful and easier to analyze.

Speech recognition is a set of methodologies and technologies that provides the recognition and translation of spoken language into text by computers. Speech recognition can include automatic speech recognition (ASR), computer speech recognition and/or speech to text (STT).

Unsupervised learning is a type of machine learning algorithm that can be used when the groups/categories of data are not known to determine patterns in the data. Unsupervised learning is a term used for modelling the probability density of inputs.

Example Methods

Figure 1:
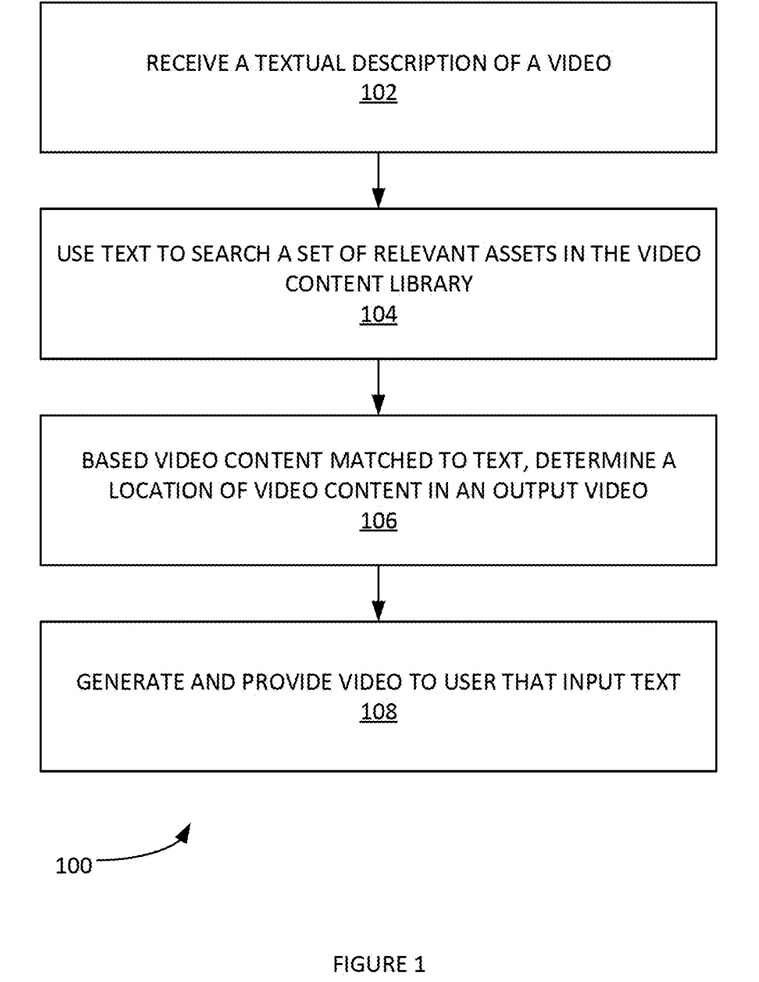
FIG. 1 illustrates an example process for automatically generating video content from scripts/text, according to some embodiments.

FIG. 1 illustrates an example process for automatically generating video content from scripts/text, according to some embodiments. in step 102, process 100 can receive a textual description of a video. In step 104, process 100 can use text to search a set of relevant assets in a specified video content library. In step 106, process 100 can, based the video content matched to text, determine a location of video content in an output video. In step 108, process 100 can generate and provide video to user that input text. The user can share the video online or via various electronic communications.

In one example, given a text, process 100 can search relevant assets in a local library of video content and/or external libraries of video content. Given a set selected of assets returned from the search, process 100 can then position the video content in a slide/video. It is noted that the output of the video can be of following three formats: digital animation; digital image-based; digital video. Example types of assets in a local library of video content can include, inter alia: backgrounds; characters; properties; music.

Process 100 can implement speech recognition. For example, process 100 can provide a voice-based interface with a speech-to text converter. In this way, process 100 can provide speech-based animation. In one example, based on a time period it took for a user to speak, process 1000 can determine a period to display an associated animation action before the video changes to next slide. This timing can be based on number of characters in sentence if the input is not voice based. The number of characters can be used to set the time to display an associated slide (e.g. as a proxy for how long it takes a user took to speak a sentence, etc.).

Example Systems

Figure 2:
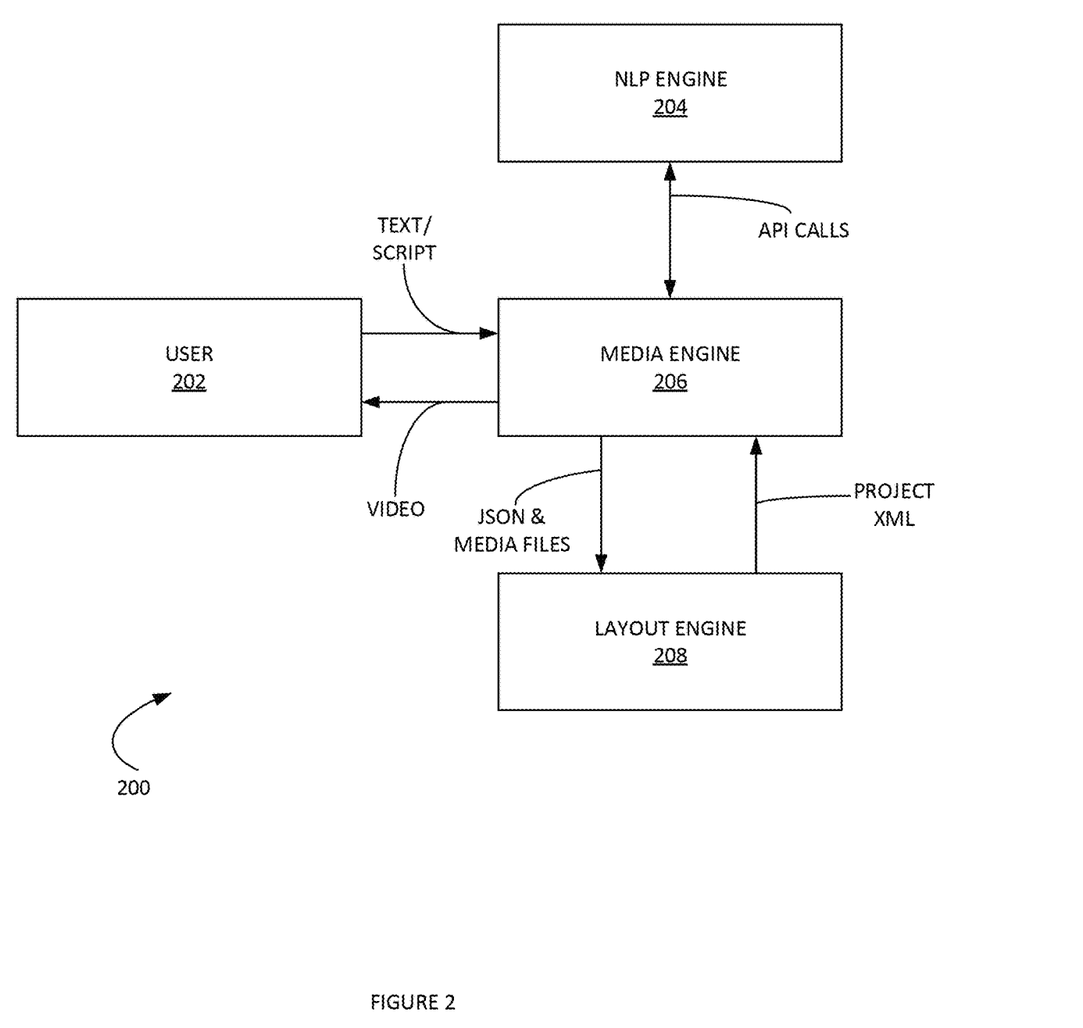
FIG. 2 illustrates an example system for automatically generating video content from scripts/text, according to some embodiments.

FIG. 2 illustrates an example system 200 for automatically generating video content from scripts/text, according to some embodiments. System 200 can implement process 100 and/or other processes provided herein.

System 200 can include an NLP engine 204. Given a text, NLP engine 204 can determine the closest match of assets in a local library of video content and/or external libraries of video content. NLP engine 204 can determine word embeddings. For example, NLP engine 204 can determine use three-hundred-dimension (300-D) word embeddings to convert each word into a vector. NLP engine 204 can use an open-source software library for advanced NLP and an associated model (e.g. en_core_web_lg and the like). NLP engine 204 can implement various sentence embeddings. NLP engine 204 can use determine the final dimensions of each sentence.

NLP engine 204 can use utilize an unsupervised machine-learning algorithm to learn mapping for each asset. For example, a k-means clustering algorithm can be used to cluster text data associated with each asset. NLP engine 204 can learn asset embeddings as a list of embeddings. NLP engine 204 can use can then map each asset to list of vectors (e.g. text converted into sentence embeddings). For each asset, a cluster list of vectors can be set into N clusters (where N is calculated using a silhouette score). NLP engine 204 can use calculate a closest vector to a centroid for all N clusters. These new calculated vectors can be set as the cluster representatives. NLP engine 204 can use list of all cluster representatives together form the embedding for a given asset.

NLP engine 204 can use an algorithm to find the closest asset match, given a text. An example algorithm can include the following steps. NLP engine 204 can use convert the text to vector representation using a specified sentence embedding. NLP engine 204 can use calculate the closest matching assets based on a Cosine Similarity score.

NLP engine 204 can use various datasets. For example, NLP engine 204 can use specified User data. NLP engine 204 can clean this data. In one example embodiments, NLP engine 204 can use utilize experts to manually annotated assets information. NLP engine 204 can implement data cleaning. In one example, NLP engine 204 can considered text which is in English language and ignore text in other languages. NLP engine 204 can considered tokens with various POS (part-of-speech) tags, such, inter alia: i. Noun: NNP, NN, NNS, NNPS ii. Verb: VB, VBZ, VBD, VBN, VBG iii. Adjective: JJ, JJR, JJS iv. Interjection: INTJ v. Adverb: ADV vi. Pronoun: PRON.

System 200 can use large datasets. For example, process 200 can use a text to video method that is not based on a rule-based approach. It rather uses a large amount of human-created animations to learn two things. First, system 200 can learn what assets to fetch for a given sentence (NLP engine). Second, system 200 can learn how to mutually place the fetched assets.

Figure 3:
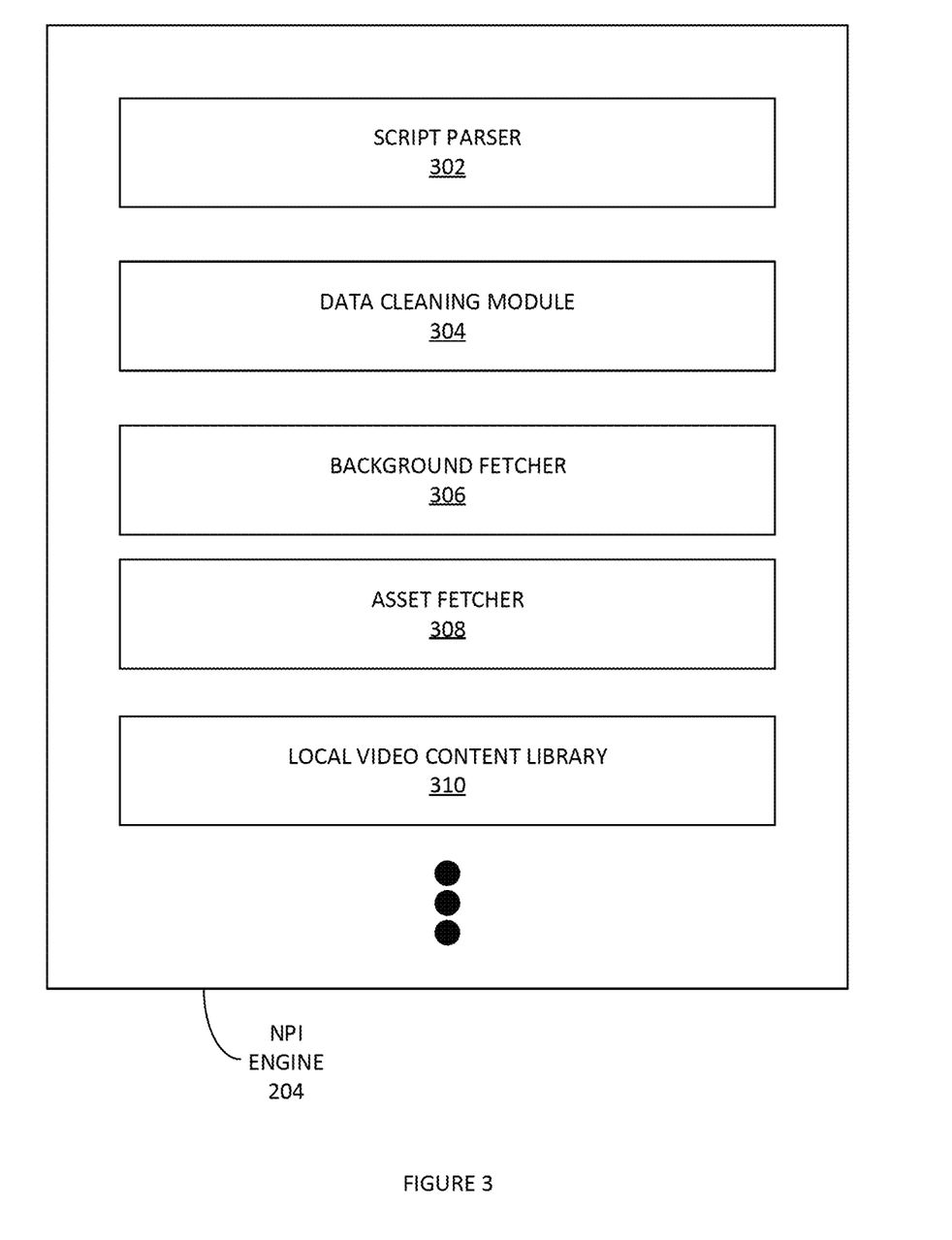
FIG. 3 illustrates an example NLP engine, according to some embodiments.

FIG. 3 illustrates an example NLP engine 204, according to some embodiments. In this example, script parser 302. Script parser 302 can return a text/script broken into slides, along with keywords, phrases, nouns and verbs/actions in the form of a JSON. Background fetcher 304 can return a most relevant background scene based on the keywords and phrases. This can be contextual search based on entire sentence and context of sentence, how have others used these phrases, etc. Asset fetcher 306 can return a most relevant set of characters based on the keywords and phrases along with associated attributes. Local video content library 308 can be a local asset library. Additional, information regarding these modules is provided infra.

Returning to system 200, system 200 can include layout engine 208. Layout engine 208 can manage construction of the whole video (e.g. as a sequence of slides). A slide can include either assets from a local asset library and/or images/videos from external sources. Inputs to layout engine 208 are now discussed. A rich JSON can be received by layout engine 208 from the media engine 206. This can be any graphical element. The JSON can include the following elements, inter alia: the raw script, etc. An array of JSON objects can be provided of which each item represents a slide. The array of JSON objects of the following elements, inter alia: the text of the slide; background from the local asset library; the characters and properties from the local asset library with their associated attributes; a hyperlink to the digital images and/or digital videos; flags; keywords and phrases; etc.

Figure 4:
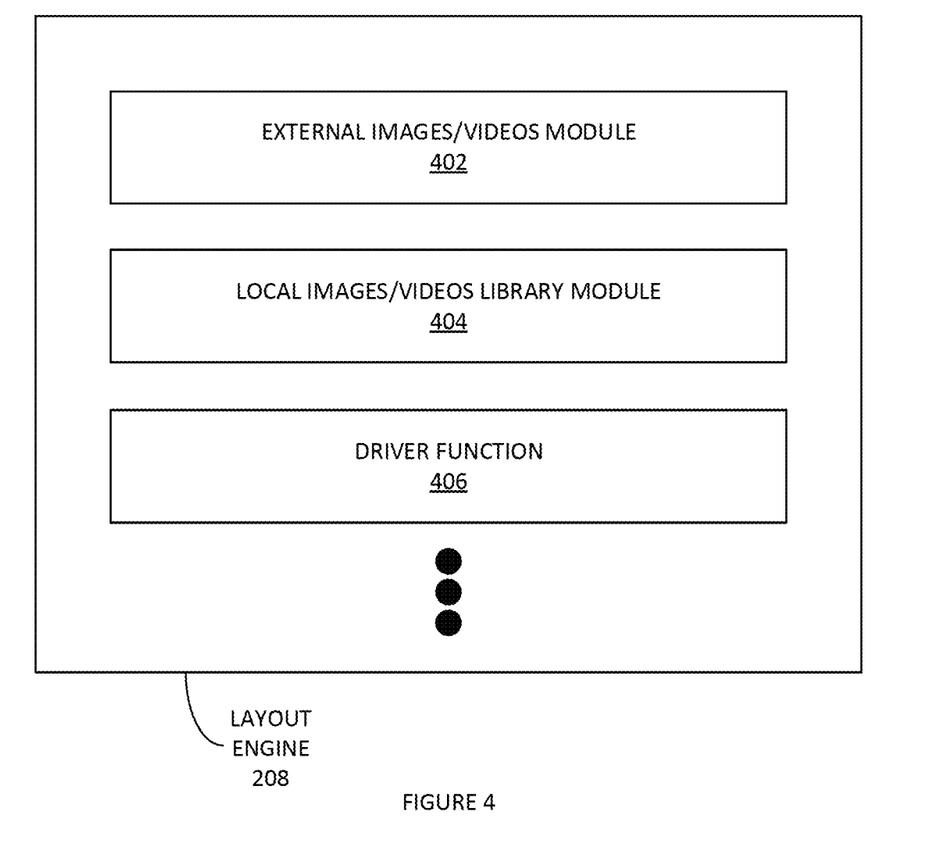
FIG. 4 illustrates an example of layout engine, according to some embodiments.

FIG. 4 illustrates an example of layout engine 208, according to some embodiments. Layout engine 208 output can include a project XML. Layout engine 208 can include external images/videos module 402 and local images/videos library module 404. Layout engine 208 can implement the following workflow. Based on the flags, a driver function (e.g. driver function 406) calls external images/videos module 402 and/or local images/videos library module 404 to deal with the creation of slide.

External images/videos module 402 uses the digital images/videos from external APIs. Local images/videos library module 404 uses assets from the local asset library. External images/videos module 402 uses the digital images/videos from external APIs: External images/videos module 402 receives the corresponding JSON containing information required to construct the slide. The related media file is then downloaded.

Based on whether the media file is digital image or a digital video one of the following action is performed. If the media file is an image, layout engine 208 can calculate saliency is over the entire digital image. Based on the saliency the digital image can then be cropped and resized in any specified aspect ratio (e.g. 16:9, etc.). The saliency is calculated again over the resized image to determine the area where text is to be placed. This can be implemented by dividing the whole image into five (5) equal regions and then choosing the region with the least standard deviation.

If the media file is a digital video, layout engine 208 can n-frames over the entire video and then merge it. The saliency is calculated again over the resized digital image to determine the area where text is to be placed. Once the alignment is returned the digital image or digital video is added to the background. The text area is then calculated and a rectangular property object of the same size as that of the text box is then added to XML to provide the highlighter effect. The text and the highlighter is then added to slide XML based on the alignment. The required enter and exit effects can also be added. The final slide JSON is then returned to driver function 406.

Returning to system 200, system 200 can include media engine 206. Media engine 206 can provide a support service that accesses and combines data from user system 202, NLP engine 204 and layout engine 208. Media engine 206 can provide the final output video. Media engine 206 can also be used to access external image/video APIs. Media engine 206 can handle uploads and downloads of media content (e.g. digital images/video, etc.) and/or other files (e.g. video XML, HTML, etc.).

In one embodiment, layout engine 208 is characterized by three important aspects. First, the objects and characters are placed in such a way that it looks logical (e.g. humans stand on the ground, chairs are placed of the ground, clouds are placed in the sky, etc.). Second, layout engine 208 provides that the layout of the scene is aesthetically pleasing (e.g. proper gaps are kept between different assets, the alignment is proper etc.). Third, layout engine 208 provides that the mutual interaction of multiple assets is reasonable. Layout engine 208 can use a machine learning approach, where existing human-made animations are used to teach the layout engine. More specifically, layout engine 208 uses the existing data from a large database of human made animations to create probabilistic grid maps. The probabilistic grid maps capture a likelihood of placing a character and/or an object a particular position in the fetched background. Layout engine 208 can also learn a pairwise probabilistic grid map. Pairwise probabilistic grid map captures the likelihood of putting the next asset given the current assets position on the given background. Once learned, the probabilistic unary and pairwise grid maps are used by the layout engine to place individual assets or assets with respect to each other. Accordingly, layout engine 208 can obtain a large amount of data and have the ability to learn from it to improve the methods.

Figure 5:
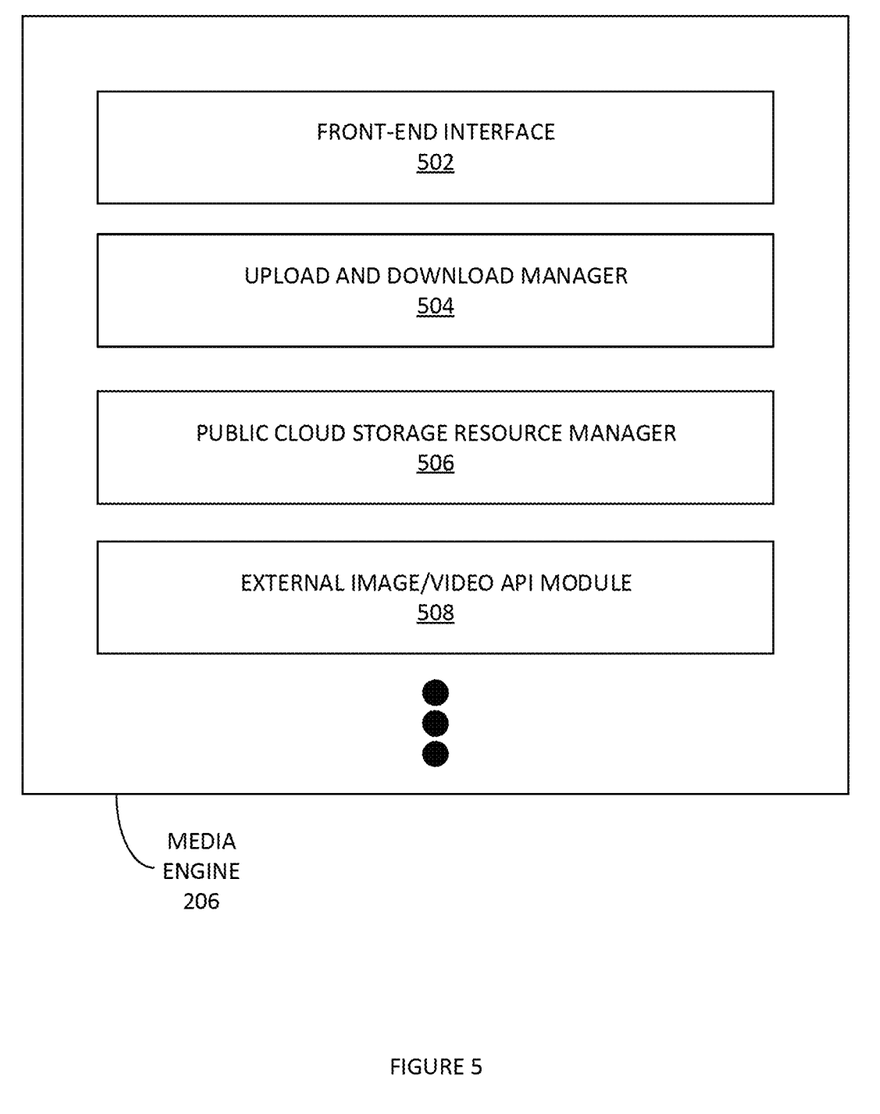
FIG. 5 illustrates an example media engine, according to some embodiments.

FIG. 5 illustrates an example media engine 206, according to some embodiments. Front-end interface 502 can communicate with user system 202 (e.g. via text, file-system transfer protocols, electronic mail, etc.). Media engine 206 can include upload and download manager 504. Upload and download manager 504 handles upload and download of media content. Media engine 206 can include public cloud storage resource manager 506. Public cloud storage resource manager 506 can manage uploads/downloads from a public cloud storage resource (e.g. AWS S3 cloud platform, etc.). Media engine 206 can include external image/video API module 508. External image/video API module 508 can obtain media content from external sources.

Media engine 206 can provide various inputs. For example, on press of a submit button on the user system 202, media engine 206 receives the following from the front end. Media engine 206 receives a script. The script can have been entered by the user (e.g. see FIG. 10 infra). Media engine 206 receives flags. A flag can be an asset flag. The asset flag can be set to true for animated videos. A flag can be a media flag. A media flag can be set true for digital videos with external images. A flag can be a video flag. A video flag can be set to true for digital videos with external video files. Media engine 206 can provide outputs. For example, in a response Media engine 206 can return a hyperlink to an HTML player with the corresponding XML.

It is noted that system 200 can add sound based on the script. System 200 can handle context; color; multiple characters in one slide; and interactions between characters and properties.

Additional Processes

Figure 6:
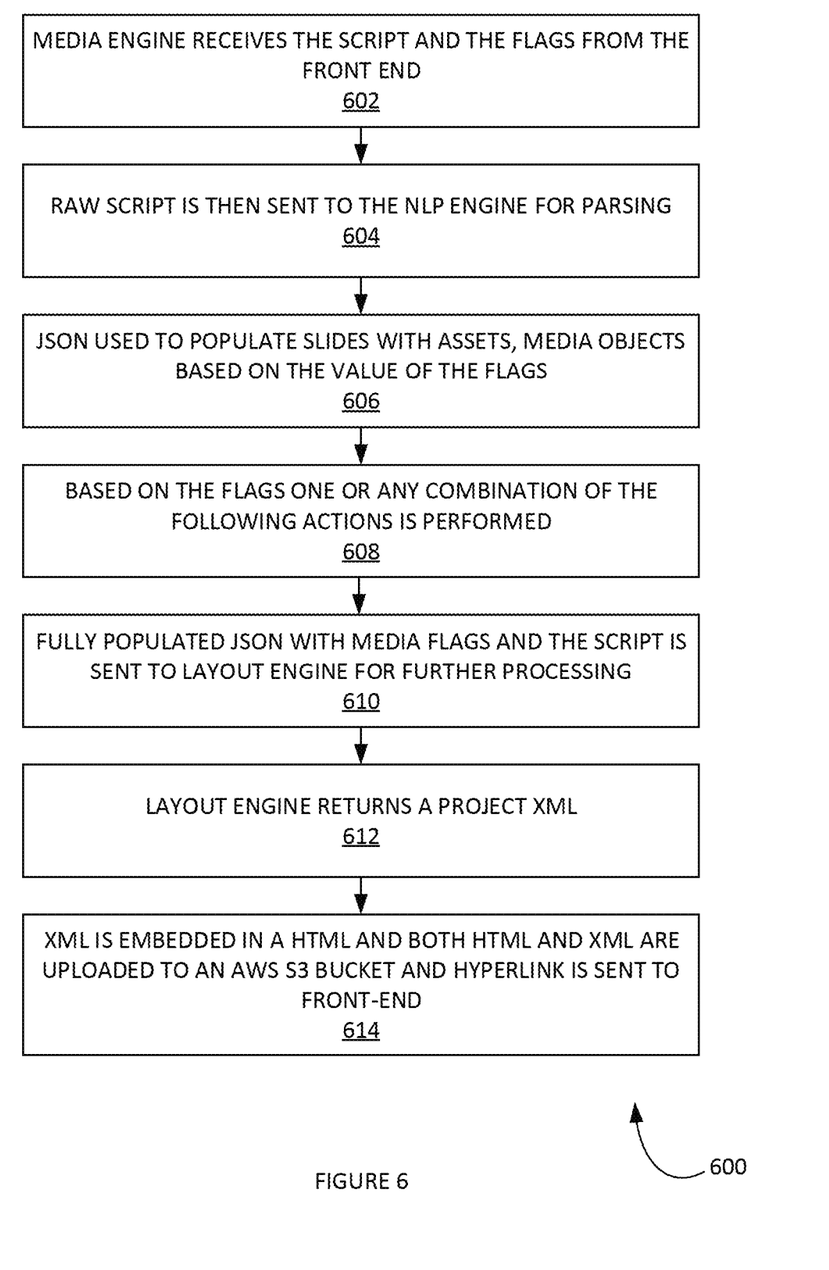
FIG. 6 illustrates an example workflow process for implementing example embodiments.

FIG. 6 illustrates an example workflow process 600 for implementing example embodiments. In step 602, the media engine receives the script and the flags from the front end. In step 604, the raw script is then sent to the NLP engine for parsing. The NLP engine then returns the parsed script in the form of JSON.

Figure 7:
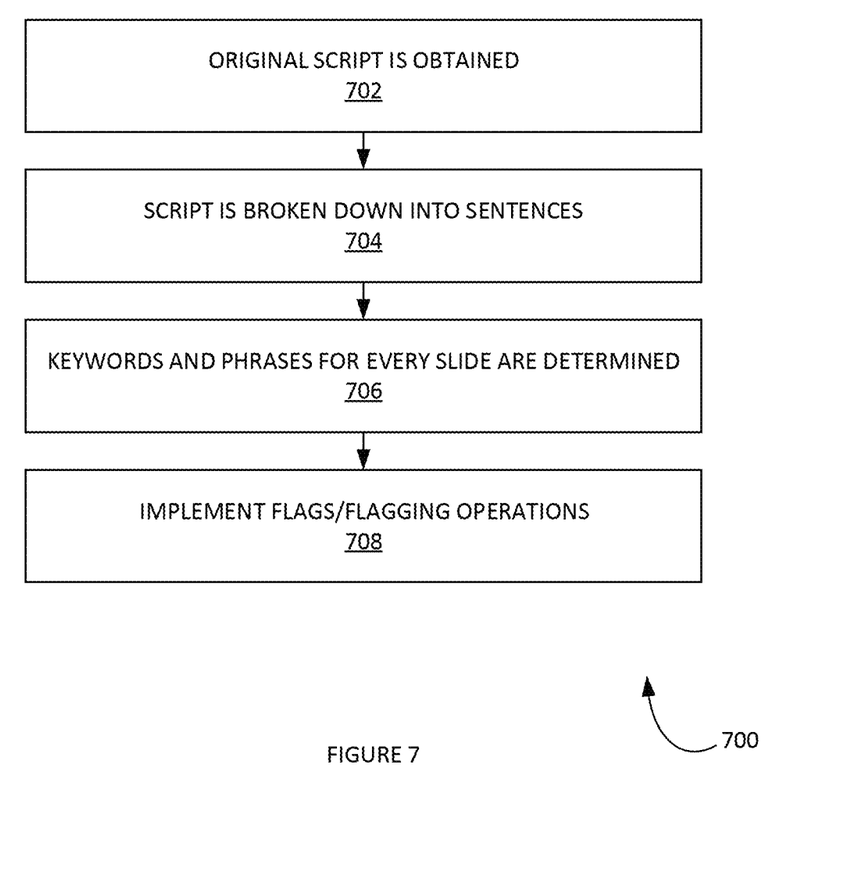
FIG. 7 illustrates an example process of an NLP engine then returns the parsed script in the form of JSON, according to some embodiments.

FIG. 7 illustrates an example process 700 of an NLP engine then returns the parsed script in the form of JSON, according to some embodiments. In step 702, the original script is obtained. In step 704, this script is broken down into sentences (e.g. each sentence can represent a slide, etc.). In step 706, the keywords and phrases for every slide are determined. These can be further classified into nouns and verbs/actions). In step 708, process 700 implements flags/flagging operations.

Returning to process 600, in step 606, the JSON is to populate every slide with assets, media objects (e.g. digital images/videos) based on the value of the flags. In step 608, based on the flags one or any combination of the following actions is performed.

Figure 8:
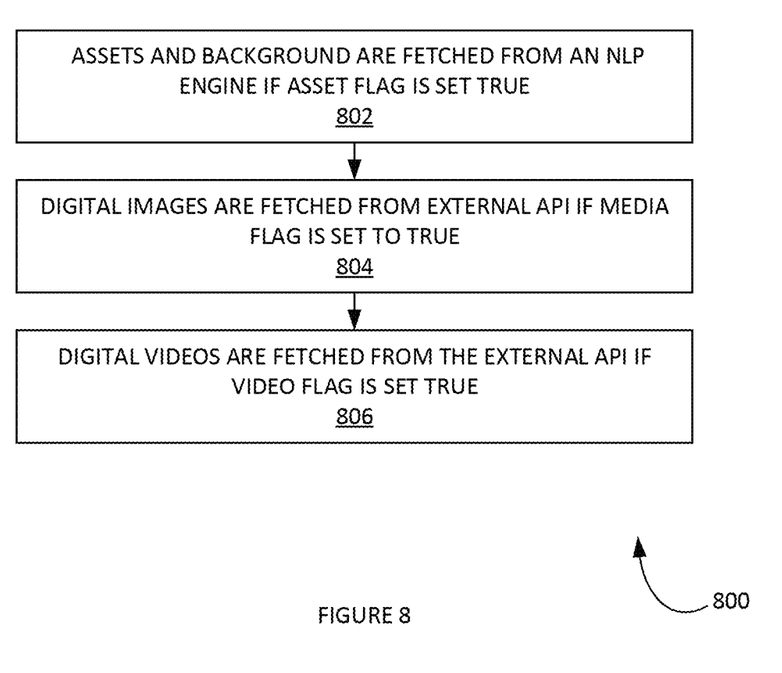
FIG. 8 illustrates process for implementing flag-based action, according to some embodiments.

FIG. 8 illustrates process 800 for implementing flag-based action, according to some embodiments. In step 802, assets and background are fetched from an NLP engine if asset flag is set true. In step 804, digital images are fetched from external API based on keywords and phrases if media flag is set to true and are uploaded to the S3 bucket. In step 806, digital videos are fetched from the external API if video flag is set true and are uploaded to the S3 bucket.

Returning to process 600, in step 610, the fully populated JSON with all the required media (background, assets, images or videos), flags and the script is then sent to the layout engine for further processing. In step 612, the layout engine then returns a Project XML (e.g. the digital video). In step 614, this XML is then embedded in a HTML and both the HTML and XML are uploaded to an AWS S3 bucket and the final hyperlink is sent to the front-end.

Figure 9:
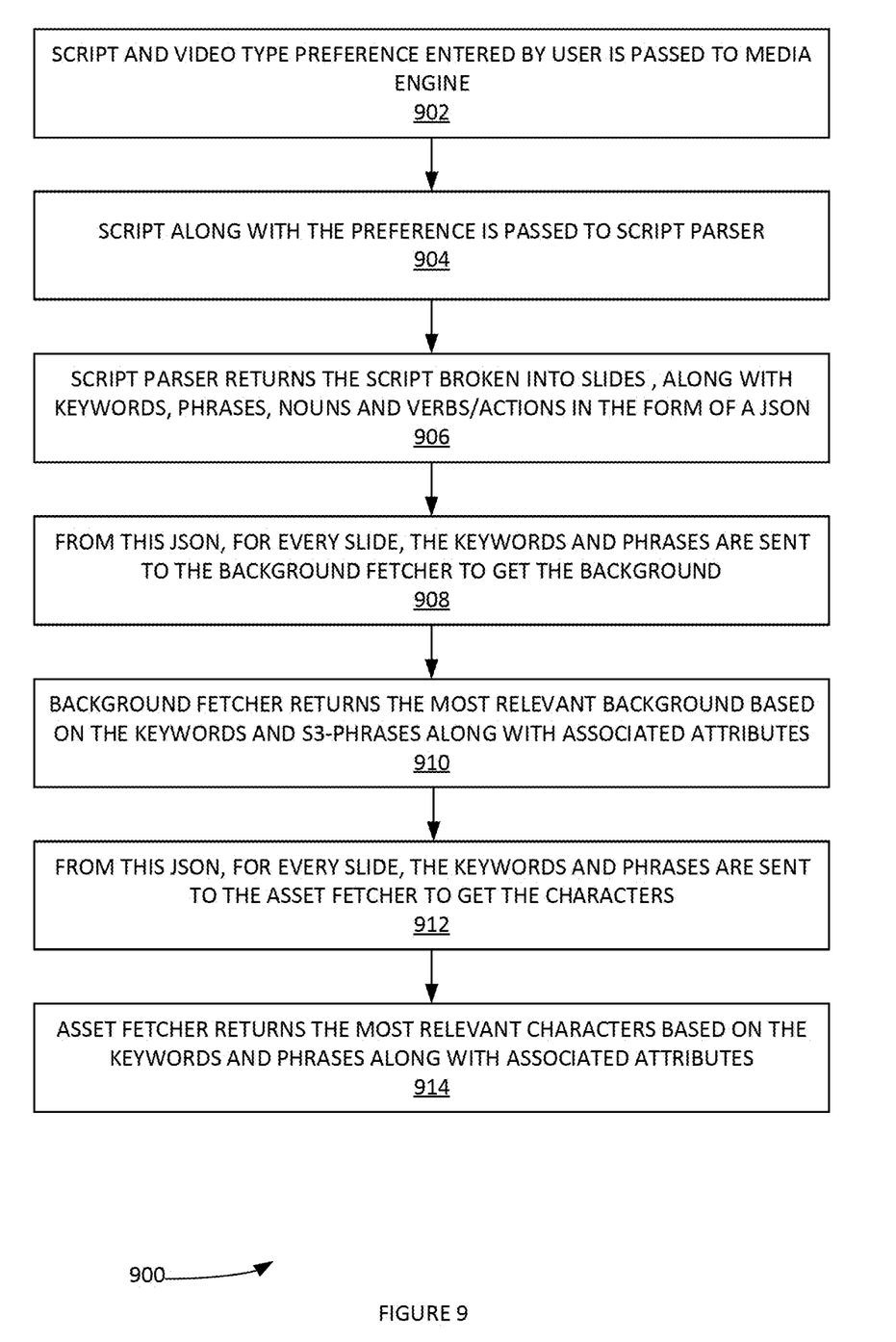
FIG. 9 illustrates another example process for automatically generating video content from scripts/text, according to some embodiments.

FIG. 9 illustrates another example process 900 for automatically generating video content from scripts/text, according to some embodiments. In step 902, the script and video type preference entered by user is passed to media engine. In step 904, the script, along with the preference, is passed to script parser. In step 906, the script parser returns the script broken into slides, along with keywords, phrases, nouns and verbs/actions in the form of a JSON. In step 908, from this JSON, for every slide, the keywords and phrases are sent to the background fetcher to get the background. In step 910, the background fetcher returns the most relevant background based on the keywords and S3-phrases along with associated attributes. In step 912, from this JSON, for every slide, the keywords and phrases are sent to the asset fetcher to get the characters. In step 914, the asset fetcher returns the most relevant characters based on the keywords and phrases along with associated attributes.

The digital video can be a two-dimensional digital video with animations and digital images in background. The background can also include animations. The digital video constitutes of sequence of slides. Every sentence of script can be represented by one or slides. The user can select a 2D animation option. Every asset in the local video-content library has attributes such as ID, URL, height, width, etc. These are used in the construction of the XML.

Example User Interface

Figure 10:
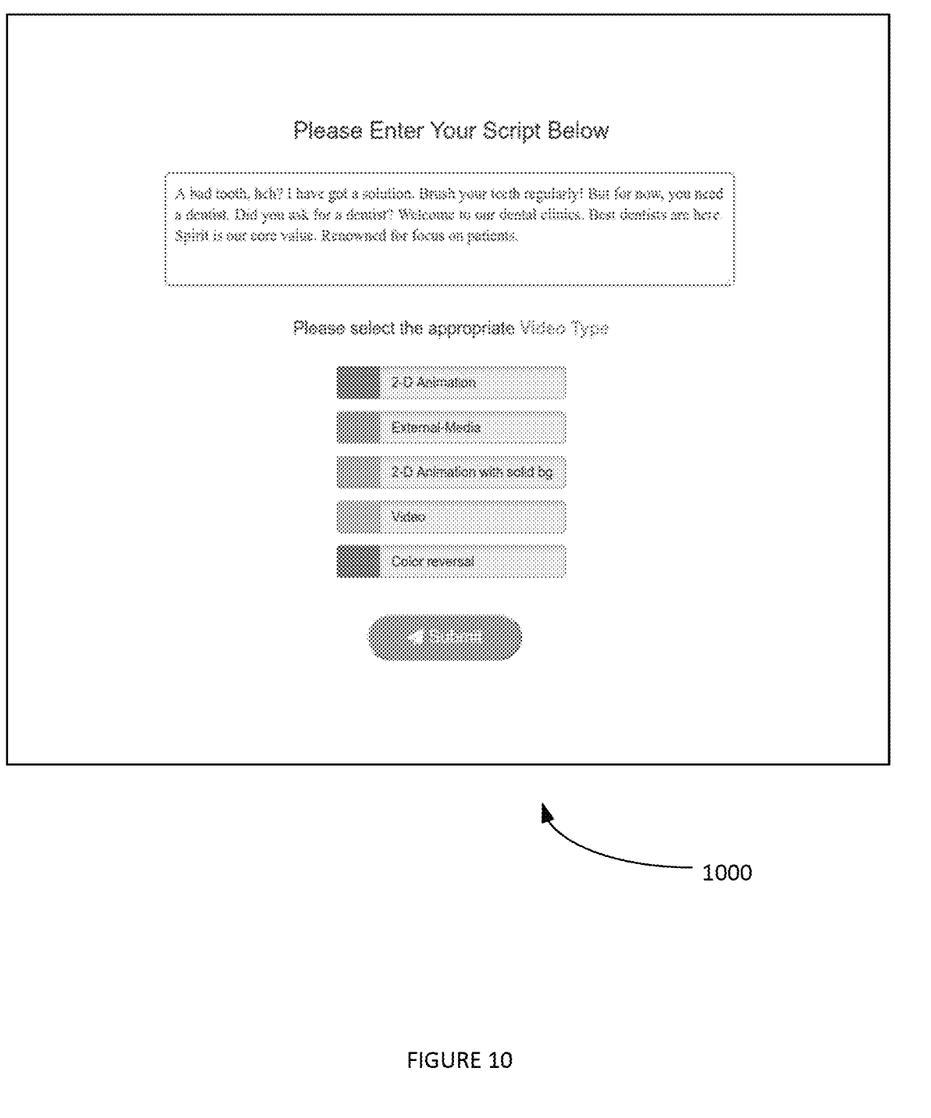
FIG. 10 illustrates an example user interface for automatically generating video content from scripts/text, according to some embodiments.

FIG. 10 illustrates an example user interface 1000 for automatically generating video content from scripts/text, according to some embodiments.

Heatmap Method

Figure 11:
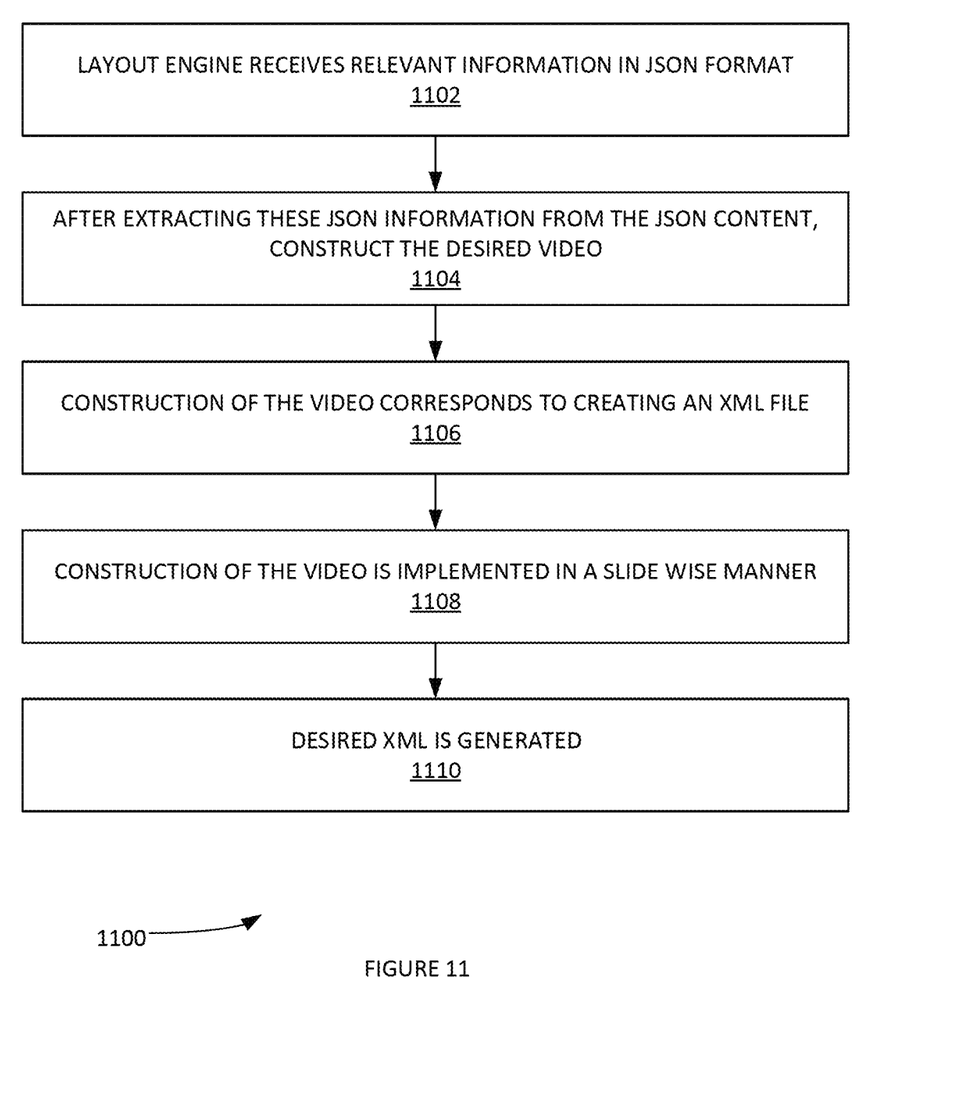
FIG. 11 illustrates an example process for automatically generating a video from an input text using a heatmap, according to some embodiments.

FIG. 11 illustrates an example process 1100 for automatically generating a video from an input text using a heatmap, according to some embodiments. In step 1102, layout engine receives relevant information in JSON format. This can be used for the construction of the output video. This JSON information contains information, such as, inter alia: background identity, object identity, action of the object, color, text to be used etc.

In step 1104, after extracting these JSON information from the JSON content, process 1100 constructs the desired video. The construction of the video corresponds to creating an XML file in step 1106. The XML has various tags related to slide information, object information, text information, etc. Process 1100 can fill these tags with the information extracted from the EON.

In step 1108, the construction of the video is implemented in a slide wise manner. For example, in a given slide, sequential placement of objects and text is performed. First, placement of a character takes place. Process 1100 can use a heatmap algorithm for this purpose. The heatmap can be generated based on the current store of past user's data. Process 1100 can then implement the placement of the text. Process 1100 can use the relative heatmap approach which is based on the heatmap algorithm. In step 1110, the desired XML is generated. This is then sent to media engine module. It is noted that a probabilistic grid map can be a heatmap.

Additional Processes

Figure 12:
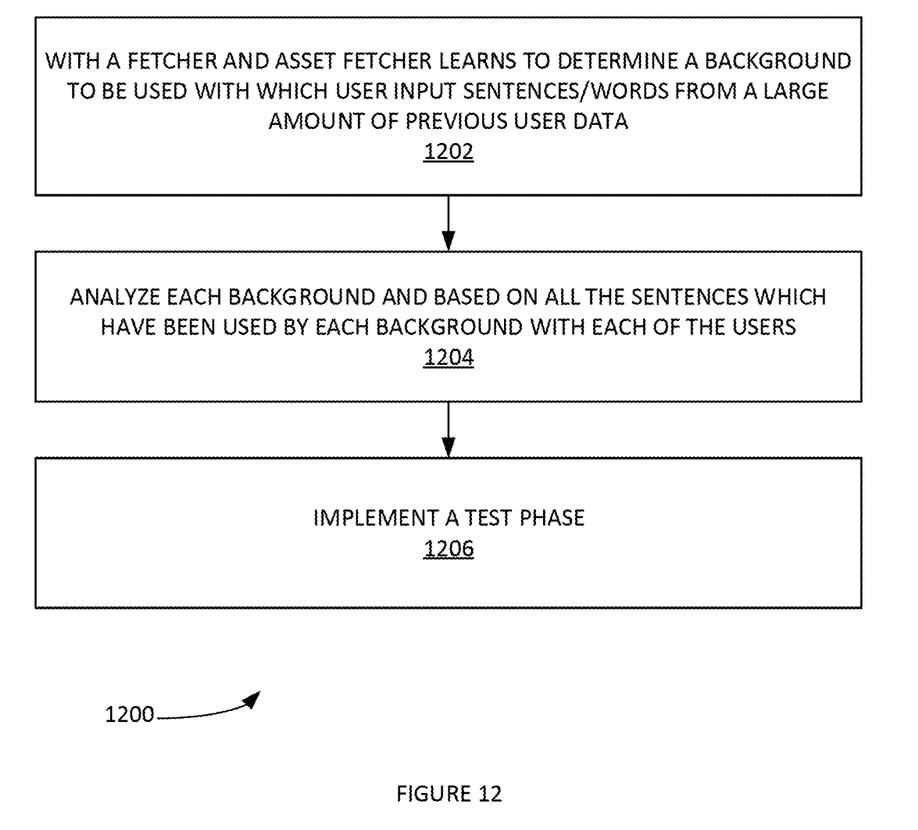
FIG. 12 illustrates an example process for automatically generating video content from scripts/text, according to some embodiments.

FIG. 12 illustrates an example process 1200 for automatically generating video content from scripts/text, according to some embodiments. In step 1202, with a fetcher and asset fetcher, process 1200 learns to determine a background to be used with which user input sentences/words from a large amount of previous user data. For example, for a sentence like 'we went for a date yesterday', it is desired to show restaurants or cafe as background. Process 1200 can search by keywords (e.g. 'date' or 'yesterday', etc.), in such a manner (e.g. contextual search, machine learning, etc.) such that the implicit usage of the input terms are learned by machine-learning methods and used.

In step 1204, process 1200 can analyze each background and based on all the sentences which have been used by each background with each of the users. Process 1200 can semantically encode each of these sentences into vectors (e.g. to semantically encode the meaning in a numeric form). Process 1200 can cluster these sentences using a clustering algorithm. Each cluster then represents a broad theme/setting/semantic where the background can be used. For example, a cluster can contain similar sentences like (e.g.

'we went for a date yesterday', 'the date on Friday was memorable', 'I am going on a date tomorrow with Lily', etc.). Similar sentences are grouped and represented by a single vector. This process is repeated for each animated background and each background then associates with multiple such clusters (each cluster representing a situation where this background is relevant). This is termed as training phase.

In step 1206, process 1200 can implement a test phase. Given a new sentence, process 1200 can compare the new sentence with all the cluster centers. Process 1200 can pick the background with a corresponding cluster center is closest to the given sentence and use it for the animation. In step 1208, process 1200 can implement the asset fetching algorithm.

As noted supra, process 1200 can, optionally, also use a voice-based interface for text. Where given a voice instruction, process 1200 convert it into text (e.g. using a speech to text converter). The text is then used for creating the animation. This can enable creation of animation by users with physical disabilities. The duration of the animation slide (e.g. how much it has to be shown) can be decided based on the time user took to speak. Process 1200 can create an animation in any aspect ratio. It is noted that once a layout is applicable, process 1200 can insert asset, text, shapes or any type of animated graphic element. It is not limited to just text and assets.

Additional Systems and Architecture

Figure 13:
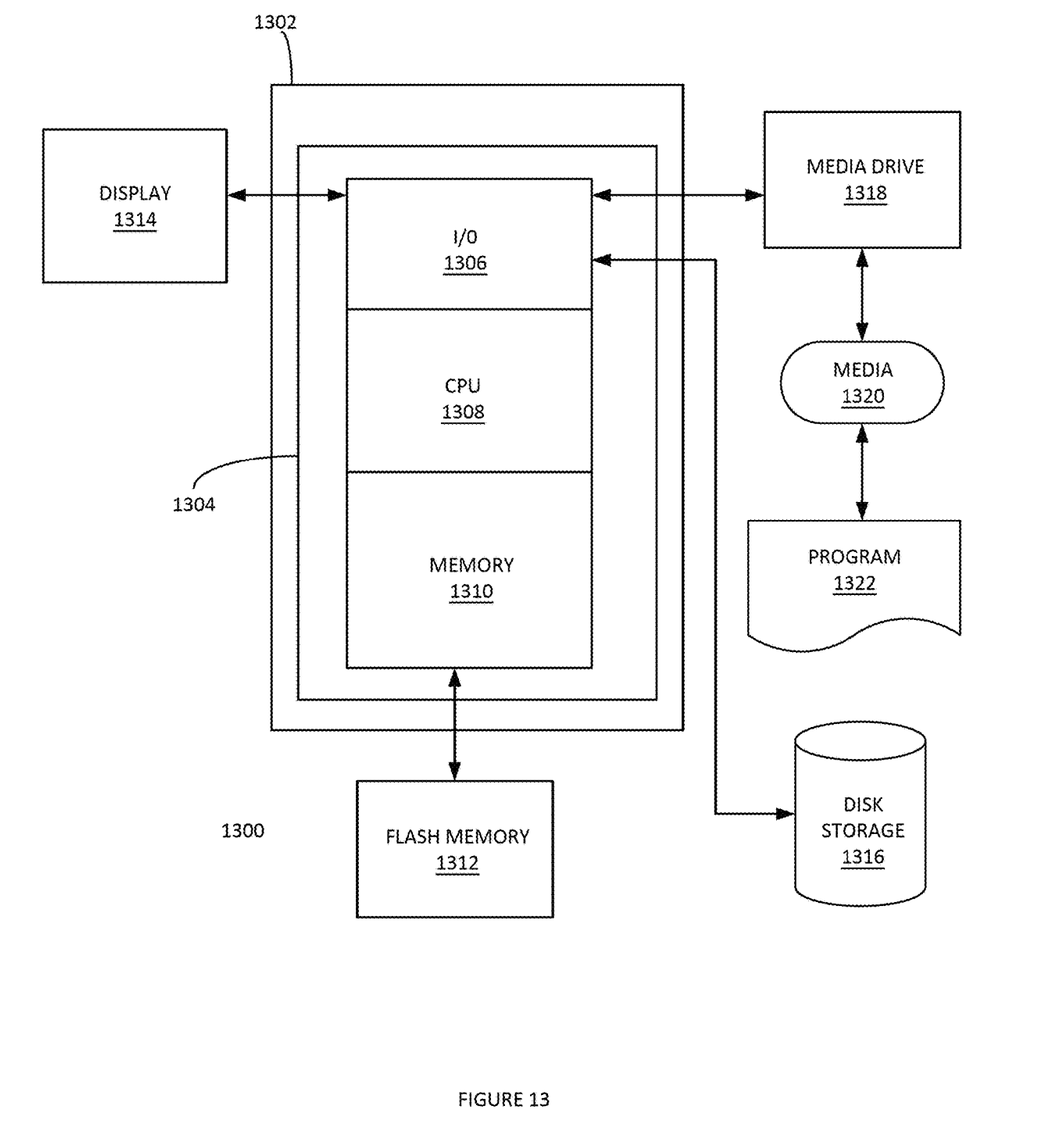
FIG. 13 depicts an exemplary computing system that can be configured to perform any one of the processes provided herein.

FIG. 13 depicts an exemplary computing system 1300 that can be configured to perform any one of the processes provided herein. In this context, computing system 1300 may include, for example, a processor, memory, storage, and I/O devices (e.g., monitor, keyboard, disk drive, Internet connection, etc.). However, computing system 1300 may include circuitry or other specialized hardware for carrying out some or all aspects of the processes. In some operational settings, computing system 1300 may be configured as a system that includes one or more units, each of which is configured to carry out some aspects of the processes either in software, hardware, or some combination thereof.

FIG. 13 depicts computing system 1300 with a number of components that may be used to perform any of the processes described herein. The main system 1302 includes a motherboard 1304 having an I/O section 1306, one or more central processing units (CPU) 1308, and a memory section 1310, which may have a flash memory card 1312 related to it. The I/O section 1306 can be connected to a display 1314, a keyboard and/or other user input (not shown), a disk storage unit 1316, and a media drive unit 1318. The media drive unit 1318 can read/write a computer-readable medium 1320, which can contain programs 1322 and/or data. Computing system 1300 can include a web browser. Moreover, it is noted that computing system 1300 can be configured to include additional systems in order to fulfill various functionalities. Computing system 1300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for automatically generating digital video content from scripts comprising:
   with a media engine:
      receiving a script and a plurality of flags;
      sending the script to a natural language processing (NLP) engine;
   with the NLP engine:
      parsing the script, wherein the script is broken into a set of keywords and phrases in a JSON format,
      based on the keywords and phrases and the plurality of flags, obtaining a relevant background scene for the video and a relevant set of assets for the video, and a set of associated attributes of each of the set of assets, wherein in an asset comprises a character or object for the video,
      providing the parsed script in the JSON format and the relevant background scene of the video and the relevant set of assets of the video, and the set of associated attributes of each of the set of assets to a layout engine,
      mapping each asset of the list of asset embedding to a list of vectors,
      using a k-means clustering algorithm to cluster the set of keywords and phrases associated with each asset in the list of assets,
      for each asset, setting a cluster list of one or more vectors into a set of clusters;
   with the layout engine:
      based on the parsed script in the JSON format, automatically constructing the video with the relevant background scene of the video and the relevant set of assets of the video, and the set of associated attributes of each of the set of assets.

2. The computerized method of claim 1, wherein the layout engine constructs the video as a series of slides.

3. The computerized method of claim 2, wherein the relevant background scene of the video and the relevant set of assets of the video are obtained from a local asset library and a specified external source.

4. The computerized method of claim 3, wherein the layout engine uses a machine-learning algorithm to construct the video with the relevant background scene of the video and the relevant set of assets of the video, and the set of associated attributes of each of the set of assets.

5. The computerized method of claim 4, wherein the machine-learning algorithm uses a set of existing human-made animations to teach the layout engine how to locate the relevant set of assets of the video in the relevant background scene of the video.

6. The computerized method of claim 5, wherein the layout engine uses a database of human made animations to create one or more probabilistic grid maps with the machine learning algorithm.

7. The computerized method of claim 6, wherein the probabilistic grid maps captures a likelihood of placing the asset in a particular position in the relevant background scene of the video.

8. The computerized method of claim 7, wherein the layout engine uses a database of human made animations to create one or more pairwise probabilistic grid maps.

9. The computerized method of claim 8, wherein the one or more pairwise probabilistic grid maps captures a likelihood of placing a next asset given the current assets position on the given background.

10. The computerized method of claim 9, wherein the layout engine uses the one or more pairwise grid maps to place individual assets in the in the relevant background scene of the video.

11. The computerized method of claim 10, wherein the layout engine uses the one or more pairwise grid maps to place one or more assets in a specified relationship with respect to each other.

12. The computerized method of claim 11 further comprising:
   with the layout engine:
      formatting the constructed video as an Extensible Markup Language (XML) file of the video.

13. The computerized method of claim 12 further comprising:
   with the media engine:
      creating a hyperlink to the XML file of the video, and
      communicating the hyperlink to an entity that provided the script.

14. The computerized method of claim 13, wherein the layout engine ensures that an alignment between assets is proper based on a set of alignment rules learned by the machine-learning algorithm.

15. The computerized method of claim 14, wherein the layout engine ensures that a mutual interaction of multiple assets is performed in a reasonable manner based a set of mutual interaction rules learned by the machine-learning algorithm.

16. The computerized method of claim 15, wherein the layout engine crops and resizes an asset to specified aspect ratio based a saliency a digital image of the asset.

* * * * *